United States Patent
Lin et al.

(10) Patent No.: US 11,514,222 B1
(45) Date of Patent: Nov. 29, 2022

(54) CELL-WIDTH AWARE BUFFER INSERTION TECHNIQUE FOR NARROW CHANNELS

(71) Applicant: Cadence Design Systems, Inc., San Jose, CA (US)

(72) Inventors: Sheng-En David Lin, Austin, TX (US); Yi-Xiao Ding, Austin, TX (US); Jhih-Rong Gao, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 17/207,266

(22) Filed: Mar. 19, 2021

(51) Int. Cl.
*G06F 30/394* (2020.01)
*G06F 111/04* (2020.01)
*G06F 117/10* (2020.01)

(52) U.S. Cl.
CPC ........ *G06F 30/394* (2020.01); *G06F 2111/04* (2020.01); *G06F 2117/10* (2020.01)

(58) Field of Classification Search
USPC ....................................................... 716/126
See application file for complete search history.

(56) References Cited

U.S. PATENT DOCUMENTS

| | | | |
|---|---|---|---|
| 6,948,138 B1 * | 9/2005 | Shen | G06F 30/392 716/122 |
| 2004/0225981 A1 * | 11/2004 | Cocchini | G06F 30/327 716/114 |

* cited by examiner

*Primary Examiner* — Bryce M Aisaka
(74) *Attorney, Agent, or Firm* — Schwegman Lundberg & Woessner, P.A.

(57) ABSTRACT

An integrated circuit (IC) design is accessed from a database in memory. The IC design comprises a routing topology for a net comprising interconnections between a set of pins. The IC design further comprises a set of candidate locations for inserting buffers. A set of cells from a cell library in memory is accessed. A candidate location from the set of candidate locations is assessed to determine whether at least one cell in the set of cells fits at the location. Based on determining that at least one cell in the set of cells fits at the candidate location, the location is marked as bufferable. A largest cell width that fits at the candidate location is determined based on the set of cells and a buffering solution is generated for the net using the largest cell width as a constraint on buffer insertion performed at the candidate location.

20 Claims, 6 Drawing Sheets

205 — ACCESS IC DESIGN COMPRISING ROUTING TOPOLOGY FOR A NET

210 — ACCESS SET OF CELLS FROM CELL LIBRARY

FOR EACH CANDIDATE LOCATION:

215 — AT LEAST ONE CELL FITS CANDIDATE LOCATION? — YES →

NO ↓

220 — MARK CANDIDATE LOCATION AS UNBUFFERABLE

225 — MARK CANDIDATE LOCATION AS BUFFERABLE

230 — DETERMINE, BASED ON THE SET OF CELLS, LARGEST CELL WIDTH THAT FITS CANDIDATE LOCATION

235 — RECORD THE LARGEST CELL WIDTH THAT FITS CANDIDATE LOCATION

240 — GENERATE A BUFFERING SOLUTION FOR THE NET USING THE LARGEST CELL WIDTHS AS CONSTRAINTS

CELL-WIDTH AWARE BUFFER INSERTION TECHNIQUE FOR NARROW CHANNELS

TECHNICAL FIELD

The present disclosure generally relates to the technical field of integrated circuit design. In particular, the present disclosure addresses cell-width aware buffer insertion technique for integrated circuit (IC) design.

BACKGROUND

An integrated circuit (IC) comprises cells of similar and/or various sizes, and connections between or among the cells. A cell comprises one or more circuit elements such as transistors, resistors, capacitors, inductors, and other basic circuit elements grouped together to perform a logic function. Each cell includes several pins interconnected by wires to pins of one or more other cells. A net includes interconnections between a set of pins to form connections between or among the pins. An IC design may include multiple nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Placement and routing are key operations in the physical design cycle and are often referred to collectively as a "place and route" stage. During placement, exact locations are assigned to various components within an IC's core area. Further optimizations are often performed to fix timing and design rule violations in the design. EDA applications often include buffer insertion engines that insert buffers or inverters at exact locations while optimizing circuit characteristics according to design rules. A buffering engine takes a synthesized netlist together with a technology library and produces a placement layout.

In general, buffer insertion includes determining whether a buffer can be inserted at a given location within a design and if so, selecting a buffer or inverter cell from a cell library to be inserted at the location. Conventional approaches to determining whether a buffer (or inverter) can be inserted at a given location involve assessing whether the widest cell in a cell library can be placed at the location. If so, the location is marked as bufferable, and if not, the location is marked as not bufferable. However, if the widest cell in the library does not fit at the location and the location is within a narrow channel (e.g., between two macros and/or blockages), then all locations within the channel will be marked as not bufferable. As a result, there may be design rule violations or other timing-related issues caused by not being able to insert any buffers or inverters along the channel.

In an alternative approach, the bufferability of a given location can be assessed in a similar manner using the smallest cell in the cell library. However, this may cause buffer or inverter cells to be inserted that are too wide for a narrow channel, and as a result, these buffers may be placed far away from the buffer locations in downstream optimization operations, which can also cause design rule violations or timing degradations.

Aspects of the present disclosure address problems with the conventional approaches to buffer insertion during electronic design automation (EDA), among others, using a cell-width aware buffer insertion technique. As an example, an EDA system (e.g., a computing device executing EDA software) accesses a IC design from a database in memory. The IC design comprises a routing topology for a net comprising interconnections between a set of pins. The IC design further comprises a set of candidate locations for inserting buffers. The EDA system accesses a set of usable buffer or inverter cells from a cell library in memory that can be inserted at the candidate locations. Each candidate location from the set of candidate locations is assessed to determine whether at least one cell in the set of cells fits at the location. For example, the EDA system can check whether at least the narrowest cell in the set of cells fits at a given location.

Based on determining at least one cell in the set of cells fits at a candidate location, the location is marked as bufferable. A largest cell width that fits at the candidate location is determined by the EDA system based on the set of cells. For example, the EDA system can sort the set of cells in ascending order based on cell width, and for each candidate location, the EDA system can perform a binary search to identify the widest cell in the set of cells that fits at the location. The largest cell width that fits at each location is recorded in the database.

The EDA system generates a buffering solution for the net using the largest cell width recorded for each candidate location as a constraint on buffer insertion performed at the location. Unlike conventional approaches to buffer insertion, the cell-width aware buffer insertion approach is able to accurately determine whether a location is bufferable, thereby improving the quality of the buffering solution.

Figure 1:
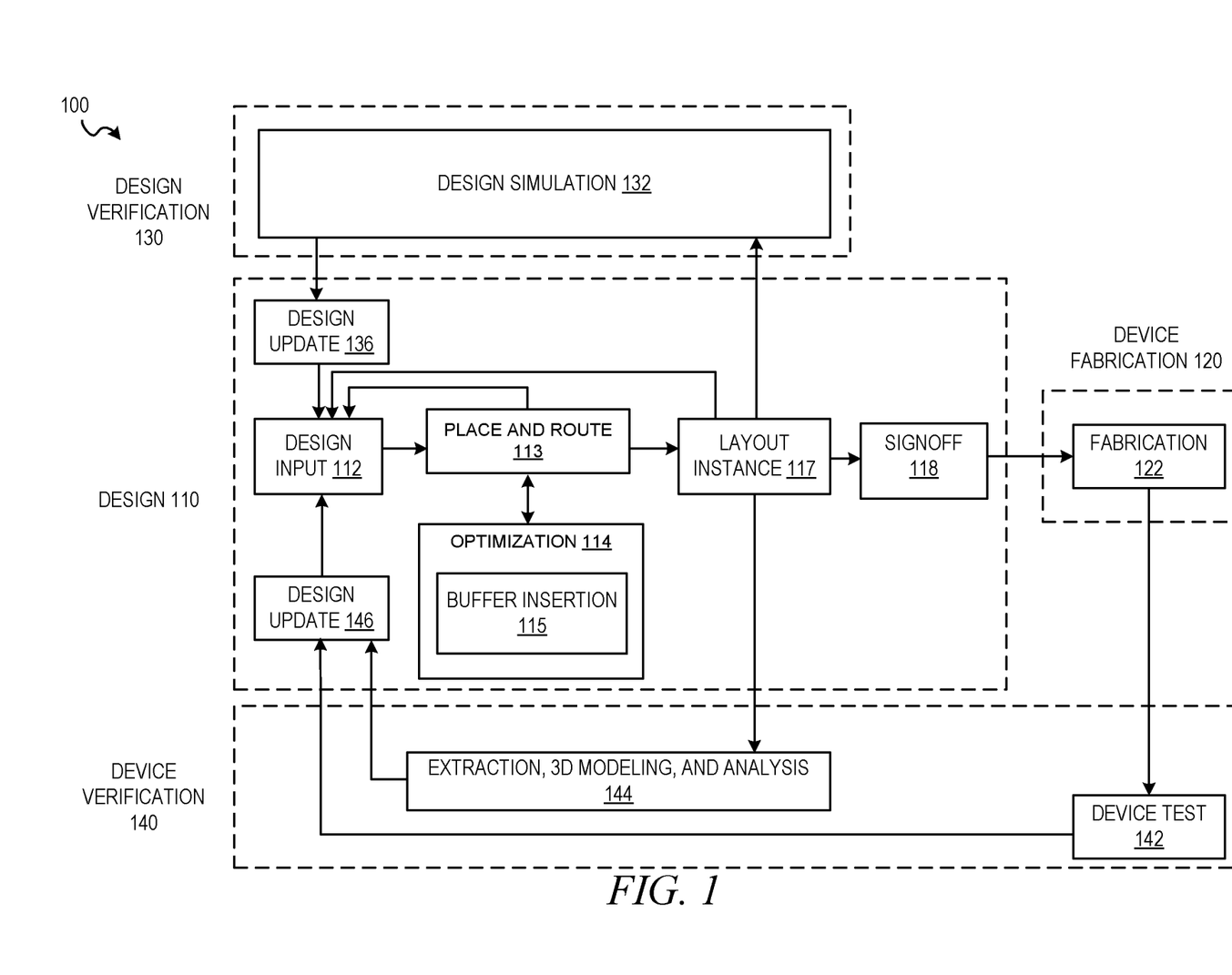
FIG. 1 is a diagram illustrating an example integrated circuit (IC) design process flow that includes a cell-width aware buffer insertion method, according to some embodiments.

FIG. 1 is a diagram illustrating an example integrated circuit (IC) design process flow in an EDA system (e.g., a computing device executing EDA software) that includes a cell-width aware buffer insertion method, according to some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in an optimization 114 operation along with any other automated design processes. While the design process flow 100 shows place and route 113 and optimization 114 occurring prior to a layout instance 117, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation can include buffer insertion 115 method. The buffer insertion 115 method can, for example, be performed by a buffering engine of the EDA system. In an example of the buffer insertion 115 method, the EDA system accesses a IC design from a database. The IC design comprises multiple nets to be buffered, each of which comprises interconnections between a set of pins. The IC design further comprises a set of candidate locations for inserting buffers for each net. For each net, the EDA system accesses a set of usable buffer or inverter cells from a cell library that can be inserted at the candidate locations. Each candidate location from the set of candidate locations is assessed to determine whether at least one cell in the set of cells fits at the location.

Based on determining at least one cell in the set of cells fits at a candidate location, the location is marked as bufferable. A largest cell width that fits at the candidate location is determined by the buffering engine based on the set of cells. For example, the EDA system can sort the set of cells in ascending order based on cell width, and for each candidate location, the EDA system can perform a binary search to identify the widest cell in the set of cells that fits at the location. The largest cell width that fits at each location is recorded in the database. The EDA system generates a buffering solution for the net using the largest cell width recorded for each candidate location as a constraint on buffer insertion performed at the location.

After design inputs are used in the design input 112 operation to generate a circuit layout, and any of the routing and optimization 114 operations are performed, a layout is generated in the layout instance 117. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 117 is generated. In various embodiments, whenever design inputs are used to update or change an aspect of a circuit design, a timing analysis and the routing and optimization 114 operation may be performed.

Figure 2:
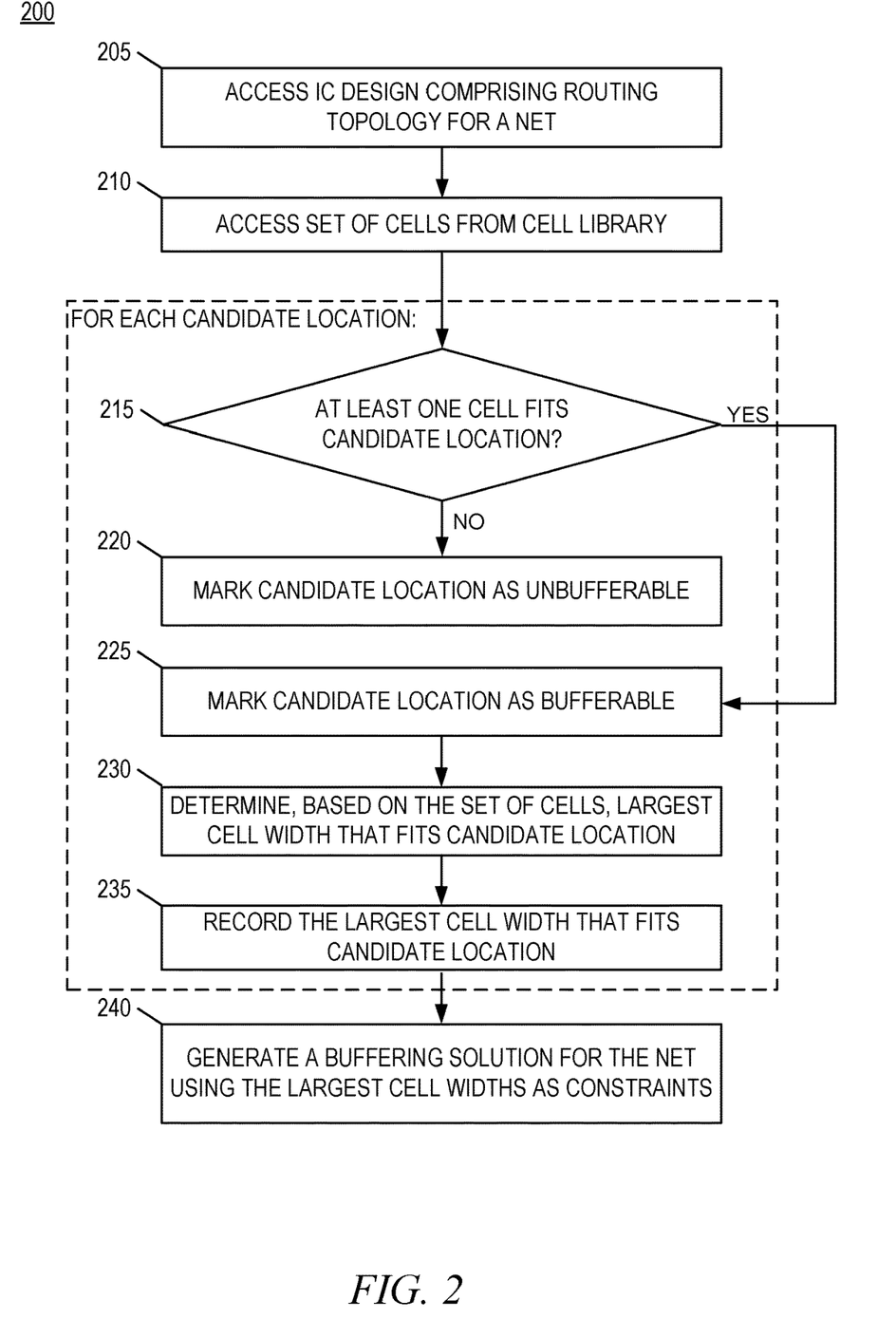
FIGS. 2-4 are flowcharts illustrating operations of the method for cell-width aware buffer insertion in an IC design, according to some embodiments.
Figure 3:
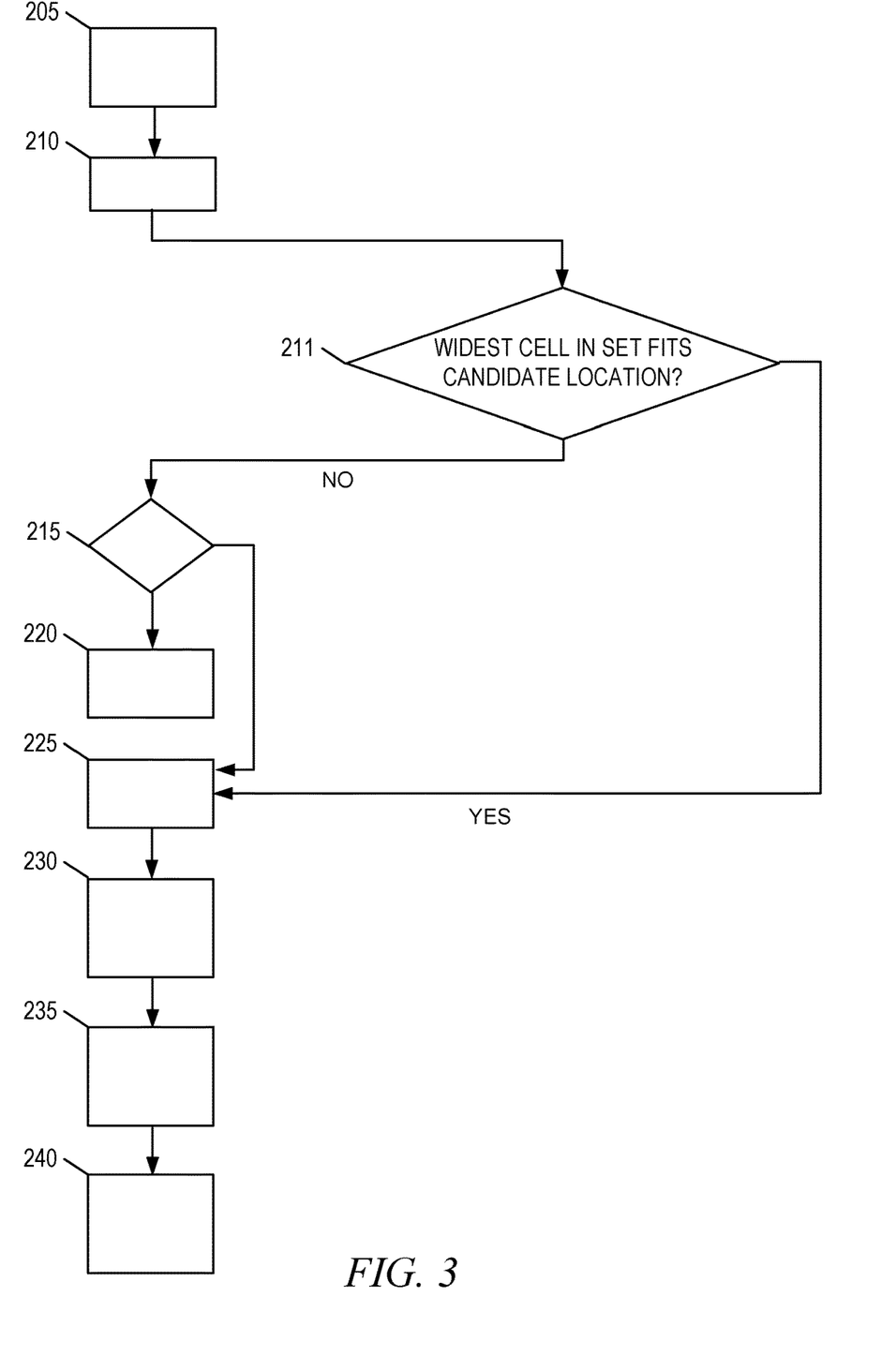
Figure 4:
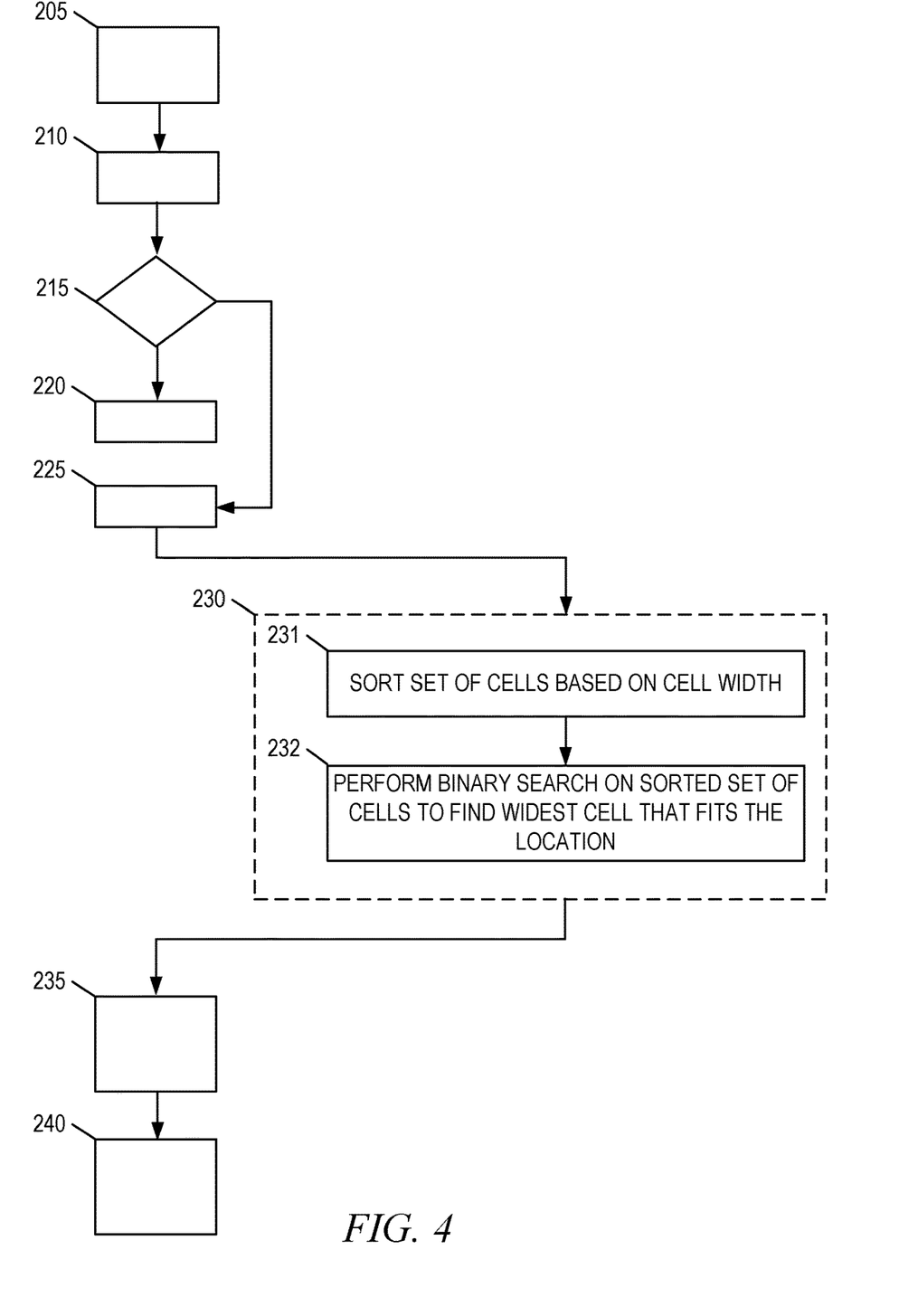

FIGS. 2-4 are flowcharts illustrating operations of the method 200 for cell-width aware buffer insertion in an IC design, according to some embodiments. For some embodiments, the method 200 is performed as part of a place and route process applied to a circuit design (e.g., by an EDA software system). In some embodiments, the method 200 is performed by a buffering engine of an EDA software system.

It will be understood that the method 200 may be performed by a processing device, such as a computing device executing instructions of an EDA software system. For example, the operations of a method 200 may be represented by executable instructions (e.g., EDA software) that, when executed by a processor of a computing device, cause the computing device to perform the method 200. Thus, an operation of the method 200 may be performed by one or more hardware processors (e.g., central processing unit or graphics processing unit) of a computing device (e.g., desktop, server, etc.). The one or more hardware processors may also operate to support performance of the method 200 in a "cloud computing" environment or as a "software as a service" (SaaS), in which any one or more operations of the method 200 are performed by one or more computing devices that are accessible via a network (e.g., the Internet) and via one or more appropriate interfaces (e.g., an API).

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel. Additionally, one or more operations can be omitted in various embodiments. Thus, not all operations are required in every embodiment. Other process flows are possible.

At operation 205, the computing device accesses integrated circuit (IC) design from a database in memory. The database comprises data describing an IC design that includes a net and a routing topology for the net. The routing topology comprises routing paths for interconnections between pins of the net. The IC design specifies a set of candidate insertion locations along the routing topology of the net as well as placement blockages and macros in the design layout. Each candidate insertion location corresponds to a point on a routing path of the routing topology at which a buffer or inverter cell may be inserted. Points on the routing path that are within placement blockages are excluded as candidate insertion locations and are indicated in the database as being unbufferable.

The computing device accesses a set of cells from a cell library in memory, at operation 210. The set of cells can include buffer cells or inverter cells. The set of cells includes cells of multiple cell widths. As an example, the set of cells can include a first cell that has a first width, a second cell that has a second width, a third cell that has a third width, and so forth.

As noted above, a set of candidate insertion locations are specified for the net. In the description that follows, although a single candidate insertion location is addressed for simplicity, each candidate location in the set of candidate locations can be processed in the manner described below.

The computing device, at operation 215, determines whether at least one cell in the set of cells fits at a candidate location from among the set of candidate locations. The determining of whether at least one cell in the set of cells fits at the candidate location may include the computing device determining whether the cell with the narrowest width fits at the candidate location. If the cell with the narrowest width does not fit at the candidate insertion location, the computing device marks the candidate insertion location as unbufferable, at operation 220. In marking the candidate location as unbufferable, the computing device updates the database to indicate that the candidate location is unbufferable.

If at least the cell with the narrowest width fits at the candidate insertion location, the computing device marks the candidate location as bufferable, at operation 225, and determines a largest cell width that fits at the candidate location based on the set of cells, at operation 230. Further details regarding operation 230 are discussed below.

At operation 235, the computing device records the largest cell width that fits at the candidate insertion location. In recording the largest cell width for the candidate insertion location, the computing device updates the IC design database to indicate the largest cell width for the candidate insertion location.

The computing device, at operation 240, generates a buffering solution for the net using the largest cell widths recorded for each bufferable candidate location as constraints. In generating the buffering solution, the computing device performs buffer insertion at each candidate location marked as being bufferable. For a given bufferable candidate location, the computing device uses the largest cell width recorded for the location as a constraint. That is, the computing device selects a buffer or inverter cell from the set of cells that has a cell width that does not exceed the largest cell width recorded for the candidate location and inserts the cell at the candidate location. In some instances, the computing device may select and insert the cell with the largest width that can fit at the candidate location.

As shown in FIG. 3, the method 200 can, in some embodiments, include operation 211. Consistent with these embodiments, the operation 211 can be performed prior to operation 215 where the computing device determines whether at least one cell in the set of cells fits at the candidate location. At operation 211, the computing device determines whether the widest cell in the set of cells fits at the candidate insertion location. If the cell with the largest width does not fit, the method 200 proceeds to operation 215, which is described above.

If the cell with the largest width does fit, the method 200 proceeds to operation 225 where the computing device marks the candidate location as bufferable. Consistent with these embodiments, the computing device determines, at operation 230, that the largest width of cell that fits at the candidate location corresponds to the widest cell in the set of cells.

As shown in FIG. 4, the method 200 can include operations 231 and 232. Consistent with these embodiments, the operations 231 and 232 can be performed as part of operation 230 where the computing device determines the largest cell width that fits the candidate location. At operation 231, the computing device sorts the set of cells based on cell width (e.g., in ascending order). The computing device performs a binary search on the sorted set of cells to find the widest cell that fits at the candidate location. That is, the computing device assesses cells in the sorted set of cells in sorted order. If the computing device determines a cell fits at the location, the computing device may prune out cells with a narrower width and continue the search for the widest cell that fits from the remaining cells. Similarly, if the computing device determines a cell does not fit at the location, the computing device may prune out cells with a larger width and continue the search for the widest cell that fits from the remaining cells.

Figure 5:
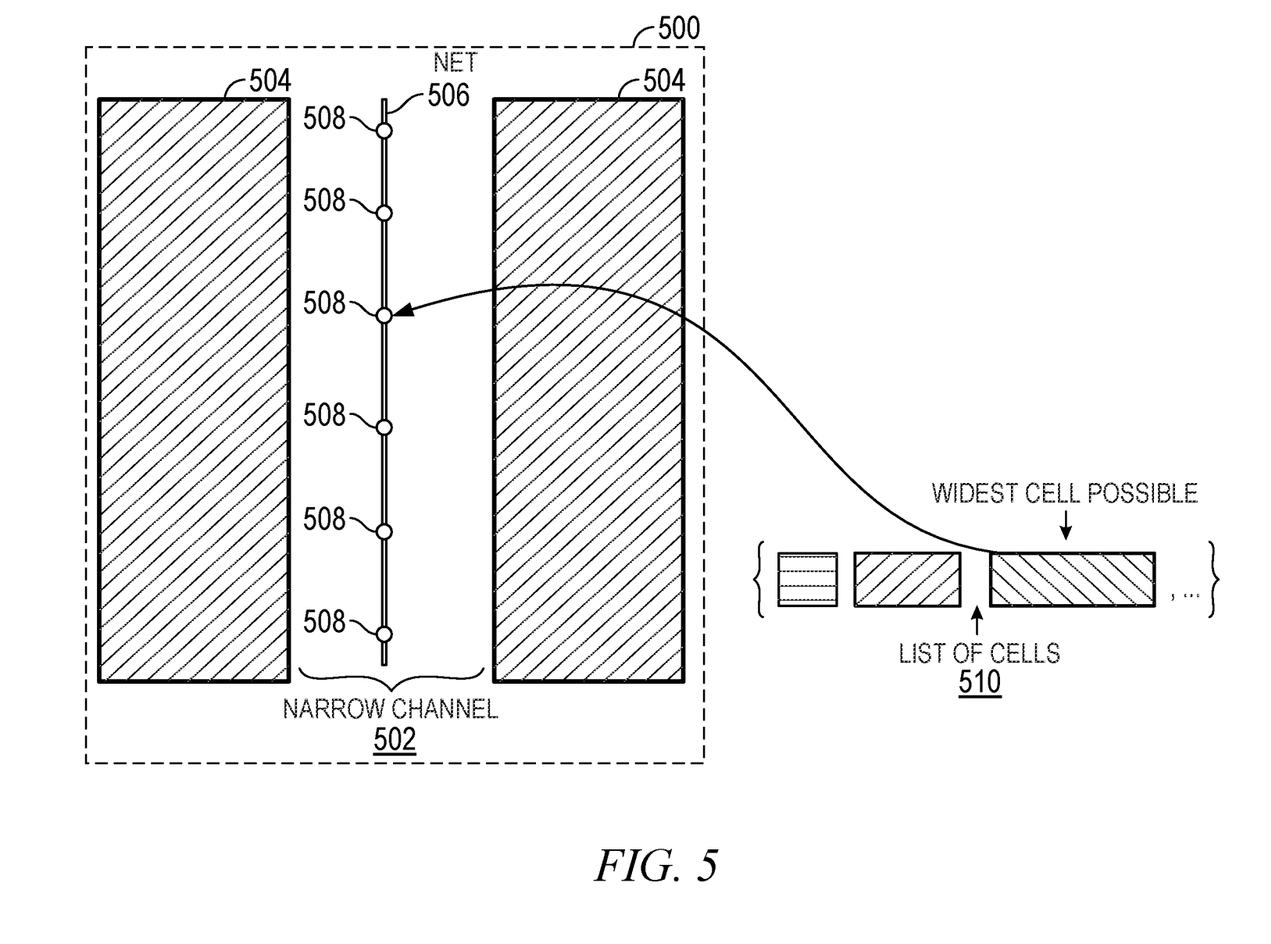
FIG. 5 is a conceptual diagram illustrating an example buffer insertion method, according to some embodiments.

FIG. 5 is a conceptual diagram illustrating an example buffer insertion method, according to some embodiments. A portion of an IC design 500 is shown. The IC design 500 includes a narrow channel 502 between two placement blockages 504 and a net 506 to be buffered within the narrow channel 502. Additionally, a set of candidate insertion locations 508 are located along a routing path that connects pins of the net 506.

In performing an example buffer method in accordance with the embodiments described herein, a buffering engine of an EDA software system accesses a list 510 of usable buffer or inverter cells that can be inserted at each candidate insertion location 508. The buffering engine can sort the list 510 based on cell width, and use the sorted list 510 to determine whether each candidate insertion location is bufferable. If so, the buffering engine identifies the widest cell in the list 510 that fits at a given bufferable candidate insertion location 508. For a given candidate insertion location 508, the buffering engine can determine whether the cell with the narrowest width fits at the location, and if not, the location is marked as unbufferable. If the narrowest cell width in the list 510 fits at the candidate insertion location 508, the location is marked as bufferable and the buffering engine determines whether any wider cells fit.

Prior to searching the entire list 510, the buffering engine can check whether the widest cell in the list 510 fits at the location, and if so, the largest cell width in the list 510 is recorded as the widest possible cell for the location and no further search is performed. Otherwise, the buffering engine performs a binary search of the list 510 to identify the widest cell that can fit at the candidate insertion location 508.

Figure 6:
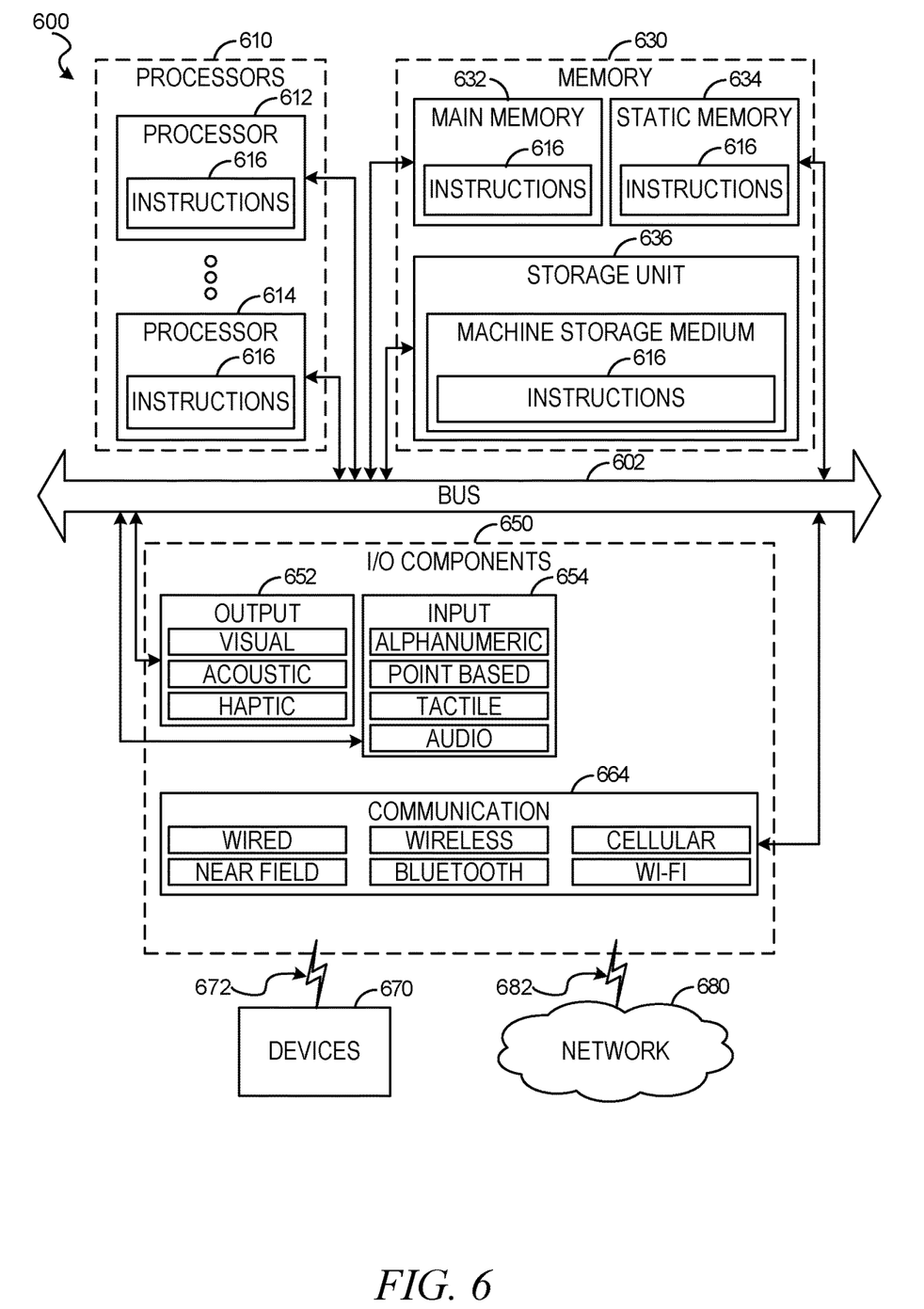
FIG. 6 is a diagrammatic representation of a machine in the example form of a computer system within which a set of instructions for causing the machine to perform any one or more of the methodologies discussed herein may be stored and executed.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may correspond to an EDA software system that causes the machine 600 to execute the method 200. Additionally, or alternatively, the instructions 616 may implement FIGS. 1 and 5. The instructions 616 transform the general, non-programmed machine 600 into a particular machine 600, such as an EDA system, programmed to carry out the described and illustrated functions in the manner described here. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors 610 that may comprise two or more independent processors (sometimes referred to as "cores") that may execute instructions 616 contemporaneously. Although FIG. 6 shows multiple processors 610, the machine 600 may include a single processor with a single core, a single processor with multiple cores (e.g., a multi-core processor), multiple processors with a single core, multiple processors with multiple cores, or any combination thereof.

The memory 630 may include a main memory 632, a static memory 634, and a storage unit 636, both accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, and other communication components to provide communication via other modalities. The devices 670 may be another machine or any of a wide variety of peripheral devices (e.g., a peripheral device coupled via a universal serial bus (USB)).

Executable Instructions and Machine Storage Medium

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions, when executed by the processor(s) 610, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, "computer-storage media," and "device-storage media" specifically exclude carrier waves, modulated data signals, and other such media, at least some of which are covered under the term "signal medium" discussed below.

Transmission Medium

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A electronic design automation (EDA) system comprising:
   one or more processors of a machine; and
   a computer storage medium storing instructions, which when executed by the machine, cause the machine to perform operations comprising:
   accessing, from a database, an integrated circuit (IC) design comprising a routing topology for a net comprising interconnections between a set of pins, the IC design further comprising a set of candidate locations for inserting buffers;
   accessing a set of cells from a cell library;
   determining that at least one cell in the set of cells fits at a candidate location in the set of candidate locations;
   based on the determining that at least one cell in the set of cells fits at the candidate location, marking the candidate location as bufferable;
   determining, based on the set of cells, a largest cell width that fits at the candidate location; and
   generating a buffering solution for the net using the largest cell width as a constraint for buffer insertion at the candidate location.

2. The EDA system of claim 1, wherein the operations further comprise:
   recording, in the database, the largest cell width that fits at the candidate location.

3. The EDA system of claim 1, wherein the determining that at least one cell in the set of cells fits at the candidate location comprises:
   determining a narrowest cell in the set of cells fits at the candidate location.

4. The EDA system of claim 1, wherein determining the largest cell width that fits at the candidate location comprises:
   sorting the set of cells based on cell width; and
   performing a binary search on the sorted set of cells to identify a widest cell that fits at the candidate location.

5. The EDA system of claim 4, wherein sorting the set of cells based on cell width comprises sorting the set of cells in ascending order based on cell width.

6. The EDA system of claim 4, further comprising:
   the candidate location is a first candidate location, and the operations further comprise:
   determining that the widest cell in the set of cells fits at a second candidate location;
   marking the second candidate location as bufferable based on the determining that the widest cell in the set of cells fits at the second candidate location; and
   recording, in the database, a width of the widest cell as a largest cell width that fits at the second candidate location.

7. The EDA system of claim 1, wherein:
   the candidate location is a first candidate location, and the operations further comprise:
   determining that a narrowest cell in the set of cells does not fit at a second candidate location; and
   based on the determining that the narrowest cell in the set of cells does not fit at the second candidate location, marking the second candidate location as unbufferable.

8. The EDA system of claim 1, wherein the operations further comprise:
   generating a layout instance for the IC design based in part on the buffering solution, the layout instance describing physical layout dimensions of the IC.

9. A method for electronic design automation, the method comprising:
   accessing, from a database in a memory of a computing device, integrated circuit (IC) design comprising a routing topology for a net comprising interconnections between a set of pins, the IC design further comprising a set of candidate locations for inserting buffers;
   accessing a set of cells from a cell library;
   determining that at least one cell in the set of cells fits at a candidate location in the set of candidate locations;
   based on the determining at least one cell in the set of cells fits at the candidate location, updating the database to indicate the candidate location as bufferable;
   determining, based on the set of cells, a largest cell width that fits at the candidate location;
   generating a buffering solution for the net using the largest cell width as a constraint for buffer insertion at the candidate location; and
   generating a layout instance for the IC design based in part on the buffering solution, the layout instance describing physical layout dimensions of the IC.

10. The method of claim 9, further comprising:
    recording, in the database, the largest cell width that fits at the candidate location.

11. The method of claim 9, wherein determining at least one cell in the set of cells fits at the candidate location comprises:
    determining a narrowest cell in the set of cells fits at the candidate location.

12. The method of claim 9, wherein determining the largest cell width that fits at the candidate location comprises:
    sorting the set of cells based on cell width; and
    performing a binary search on the sorted set of cells to identify a widest cell that fits at the candidate location.

13. The method of claim 12, wherein sorting the set of cells based on cell width comprises sorting the set of cells in ascending order based on cell width.

14. The method of claim 12, further comprising:
    the candidate location is a first candidate location, and the method further comprises:
    determining that the widest cell in the set of cells fits at a second candidate location;
    marking the second candidate location as bufferable based on the determining that the widest cell in the set of cells fits at the second candidate location; and
    recording, in the database, a width of the widest cell as a largest cell width that fits at the second candidate location.

15. The method of claim 9, wherein:
    the candidate location is a first candidate location, and the method further comprises:
    determining that a narrowest cell in the set of cells does not fit at a second candidate location; and
    based on the determining that the narrowest cell in the set of cells does not fit at the second candidate location, marking the second candidate location as unbufferable.

16. A computer-storage medium storing instructions, which when executed by a machine, cause the machine to perform operations comprising:
    accessing, from a database, integrated circuit (IC) design comprising a routing topology for a net comprising interconnections between a set of pins, the IC design further comprising a set of candidate locations for inserting buffers;
    accessing a set of cells from a cell library;

determining that a narrowest cell in the set of cells fits at a candidate location in the set of candidate locations;

based on the determining that the narrowest cell in the set of cells fits at the candidate location, updating the database to indicate the candidate location as bufferable;

determining, based on the set of cells, a largest cell width that fits at the candidate location;

generating a buffering solution for the net using the largest cell width as a constraint for buffer insertion at the candidate location; and generating a layout instance for the IC design based in part on the buffering solution, the layout instance describing physical layout dimensions of the IC.

17. The computer-storage medium of claim 16, wherein the operations further comprise:

recording, in the database, the largest cell width that fits at the candidate location.

18. The computer-storage medium of claim 16, wherein determining the largest cell width that fits at the candidate location comprises:

sorting the set of cells based on cell width; and performing a binary search on the sorted set of cells to identify a widest cell that fits at the candidate location.

19. The computer-storage medium of claim 16, further comprising:

the candidate location is a first candidate location, and the operations further comprise:

determining that a widest cell in the set of cells fits at a second candidate location;

marking the second candidate location as bufferable based on the determining that the widest cell in the set of cells fits at the second candidate location; and recording, in the database, a width of the widest cell as a largest cell width that fits at the second candidate location.

20. The computer-storage medium of claim 16, wherein:

the candidate location is a first candidate location, and the operations further comprise:

determining that the narrowest cell in the set of cells does not fit at a second candidate location; and based on the determining that the narrowest cell in the set of cells does not fit at the second candidate location, marking the second candidate location as unbufferable.

* * * * *